United States Patent
Miyamoto et al.

(10) Patent No.: US 7,650,451 B2
(45) Date of Patent: Jan. 19, 2010

(54) ARBITER CIRCUIT

(75) Inventors: Tetsuo Miyamoto, Kawasaki (JP);
Yasuhiro Watanabe, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 282 days.

(21) Appl. No.: 11/790,337

(22) Filed: Apr. 25, 2007

(65) Prior Publication Data
US 2008/0046611 A1   Feb. 21, 2008

(30) Foreign Application Priority Data
Aug. 17, 2006   (JP) .............................. 2006-222335

(51) Int. Cl.
*G06F 13/362* (2006.01)

(52) U.S. Cl. ...................... 710/113; 710/241; 710/244; 710/309

(58) Field of Classification Search ................. 710/107, 710/113, 116, 240, 241, 244, 309
See application file for complete search history.

(56) References Cited

U.S. PATENT DOCUMENTS

| | | | | |
|---|---|---|---|---|
| 5,778,200 A | * | 7/1998 | Gulick | ...................... 710/113 |
| 5,956,493 A | * | 9/1999 | Hewitt et al. | ................. 710/113 |
| 6,393,505 B1 | * | 5/2002 | Scalise et al. | ............... 710/107 |
| 7,062,582 B1 | * | 6/2006 | Chowdhuri | ................... 710/116 |
| 7,111,098 B2 | * | 9/2006 | Sumihiro | .................... 710/116 |
| 7,284,080 B2 | * | 10/2007 | Lin et al. | .................... 710/244 |

FOREIGN PATENT DOCUMENTS

JP    2000-201161 A    7/2000

* cited by examiner

*Primary Examiner*—Mark Rinehart
*Assistant Examiner*—Nimesh G Patel
(74) *Attorney, Agent, or Firm*—Arent Fox LLP

(57) ABSTRACT

An arbiter circuit includes a priority coefficient calculating unit, a priority coefficient comparator an acceptance determining unit, and a priority determining unit. The priority coefficient calculating unit calculates for each request an arbitration priority coefficient based on a priority level set for each request by requesters. The priority coefficient comparator compares arbitration priority coefficients calculated for the requesters by the priority coefficient calculating unit. The acceptance determining unit determines whether to accept the requests based on the comparison result by the priority coefficient comparator. When the arbitration priority coefficient calculated by the priority coefficient calculating unit is equal between two or more requests, the priority determining unit determines a priority order for accepting the requests.

12 Claims, 2 Drawing Sheets

US 7,650,451 B2

ARBITER CIRCUIT

CROSS-REFERENCE TO RELATED APPLICATIONS

This application is based upon and claims the benefit of priority from the prior Japanese Patent Application No. 2006-222335, filed on Aug. 17, 2006, the entire contents of which are incorporated herein by reference.

BACKGROUND OF THE INVENTION

1. Field of the Invention

The present invention relates to an arbiter circuit that arbitrates a plurality of requests in a computer.

2. Description of the Related Art

Conventionally, read or write requests from a plurality of requesters, e.g., blocks processing or storing data, are arbitrated in a computer such that the requests are accepted, or a right to use the bus is granted, according to predetermined priority levels. For example, the arbitration priority levels are set such that the number of accepted requests is equalized as much as possible among the requesters.

An arbitration control circuit is known that performs arbitration depending on the number of bus acquisition requests from a plurality of devices connected to a bus. Such arbitration control circuit includes an arbitration counter that counts the number of bus acquisition requests output from each of the devices, a priority setting unit that sets priority levels for the devices in advance, and a priority determining unit that, when the devices connected to the bus issue bus acquisition requests, determines which device is given a right to use the bus based on the number counted by the arbitration counter and the priority levels set by the priority setting unit (for example, Japanese Patent Laid-Open Publication No. 2000-201161).

However, such arbitration based on the priority levels set in advance has a problem that it is not possible to freely change the priority levels, such that the number of requests accepted in one period is equalized as much as possible among the requesters, whereas a larger number of requests are accepted from a specific requester in another period. Although the controller disclosed in Japanese Patent Laid-Open Publication No. 2000-201161 is capable of control according to the number of bus acquisition requests, the arbitration priority levels cannot be changed from a requester side.

SUMMARY OF THE INVENTION

It is an object of the present invention to at least solve the above problems in the conventional technologies.

An arbiter circuit according to one aspect of the present invention includes a calculating unit that calculates an arbitration priority coefficient of each of requests made by requesters, based on a priority level externally set for each request; a comparing unit that compares the arbitration priority coefficients calculated by the calculating unit; and an acceptance determining unit that determines whether to accept the requests based on a result of comparison by the comparing unit.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments according to the present invention will be explained in detail with reference to the accompanying drawings.

Figure 1:
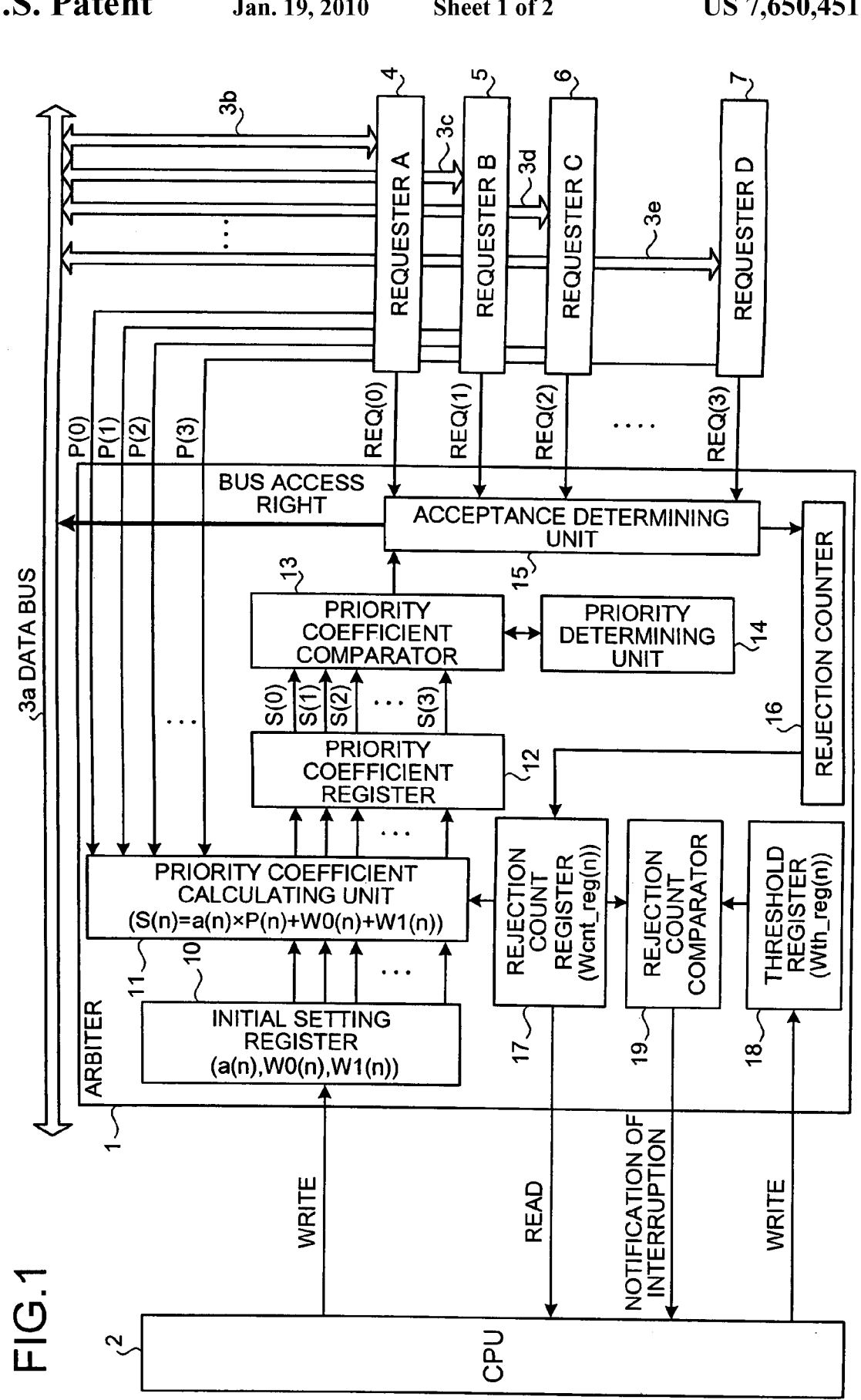
FIG. 1 is a block diagram of a device including an arbiter circuit according to an embodiment of the present invention.

FIG. 1 is a block diagram of a device including an arbiter circuit according to an embodiment of the present invention. As shown in FIG. 1, the arbiter circuit 1 includes an initial setting register 10, a priority coefficient calculating unit 11, a priority coefficient register 12, a priority coefficient comparator 13, a priority determining unit 14, an acceptance determining unit 15, a rejection counter 16, a rejection count register 17, a threshold register 18, and a rejection count comparator 19.

The arbiter circuit 1 is connected to a central processing unit (CPU) 2, a data bus 3a, and a plurality of requesters 4, 5, 6, and 7. For convenience of description, the requesters are, if necessary, identified as A, B, C, and D, and denoted by their respective reference numerals 4, 5, 6, and 7. The requesters A4, B5, C6, and D7 are connected to one another via the data bus 3a and data buses 3b, 3c, 3d, and 3e. The number of requesters may be three or less, or five or more.

The initial setting register 10 stores for each requester defaults set by writing from the CPU 2. The defaults are a multiplier coefficient a(n), a score default $W0(n)$, and an increment $W1(n)$ at the time of request rejection (hereinafter, "increment"). Here, n in "(n)" is a value of 0, 1, 2 or 3 for identifying the requester, and these values correspond to the requesters A4, B5, C6, and D7, respectively.

The multiplier coefficient a(n) is a coefficient for weighting a request from the requester with a value of 0.5, 1, 1.5 or 2, for example. The score default $W0(n)$ takes an integer, for example, between 0 and 63 as a set point for a score $W(n)$ immediately after resetting the arbiter circuit 1 or immediately after accepting a request.

The increment $W1(n)$ takes an integer, for example, between 0 and 3 as a value that is added to the score $W(n)$ when the request is not accepted. The score $W(n)$ is expressed by Equation 1 below, and represents a higher priority level as it increases. The score default $W0(n)$ takes an integer, for example, between 0 and 63, and a freeze occurs at 63.

$$W(n)=W0(n)+W1(n) \quad (1)$$

The priority coefficient calculating unit 11 calculates for each requester an arbitration priority coefficient S(n) for a request based on defaults stored in the initial setting register 10. The arbitration priority coefficient S(n) is calculated by the following Equation 2

$$S(n)=a(n){\times}P(n)+W(n) \quad (2)$$

where P(n) is an integer, for example, between 0 and 10 as a priority level notified by the requester along with the request. Specifically, the requester has a function of providing a request signal REQ(n) as well as notifying a priority level P(n) of the request to the priority coefficient calculating unit 11. The priority coefficient calculating unit 11 has a function of receiving the priority level P(n) notified by the requester.

The priority coefficient register 12 stores for each requester the arbitration priority coefficient S(n) calculated by the priority coefficient calculating unit 11. When a confliction occurs between requests from a plurality of requesters, the priority coefficient comparator 13 compares arbitration priority coefficients S(n) for the requesters, which are stored in the priority coefficient register 12, and selects the highest arbitration priority coefficient S(n). When the requesters have the same arbitration priority coefficient S(n), the priority coefficient comparator 13 selects the most prioritized arbitration priority coefficient S(n) based on determination by the priority determining unit 14.

The priority determining unit 14 has previously stored therein an order of priorities determined with respect to all requesters. Based on the priority order, the priority determining unit 14 determines priorities between the requesters that are targeted by the priority coefficient comparator 13 for priority determination because of their same arbitration priority coefficient S(n). The acceptance determining unit 15 is provided with request signals REQ(n) from all the requesters. The acceptance determining unit 15 accepts a request from a requester selected by the priority coefficient comparator 13, and grants a right to use the bus to the requester.

The rejection counter 16 counts for each requester the number of requests rejected by the acceptance determining unit 15 (a rejection count). The rejection count register 17 stores for each requester a rejection count Wcnt_reg(n) counted by the rejection counter 16. The threshold register 18 stores for each requester a rejection count threshold Wth_reg(n) set by writing from the CPU 2.

The rejection count comparator 19 compares for each requester the rejection count Wcnt_reg(n) stored in the rejection count register 17 with the rejection count threshold Wth_reg(n) stored in the threshold register 18. When the rejection count Wcnt_reg(n) becomes equal to the rejection count threshold Wth_reg(n), the rejection count comparator 19 notifies interruption to the CPU 2.

When notified of the interruption by the rejection count comparator 19, the CPU 2 refers to the rejection count register 17, for example. The CPU 2 identifies the requester whose rejection count Wcnt_reg(n) is equal to the rejection count threshold Wth_reg(n) previously set in the threshold register 18, and determines that the requester has an unexpectedly high wait count. For the requester determined as having an unexpectedly high wait count, the CPU 2 changes at least one of the multiplier coefficient a(n), the score default W0(n), and the increment W1(n) to a higher value, or changes the rejection count threshold Wth_reg(n) to a lower value.

Figure 2:
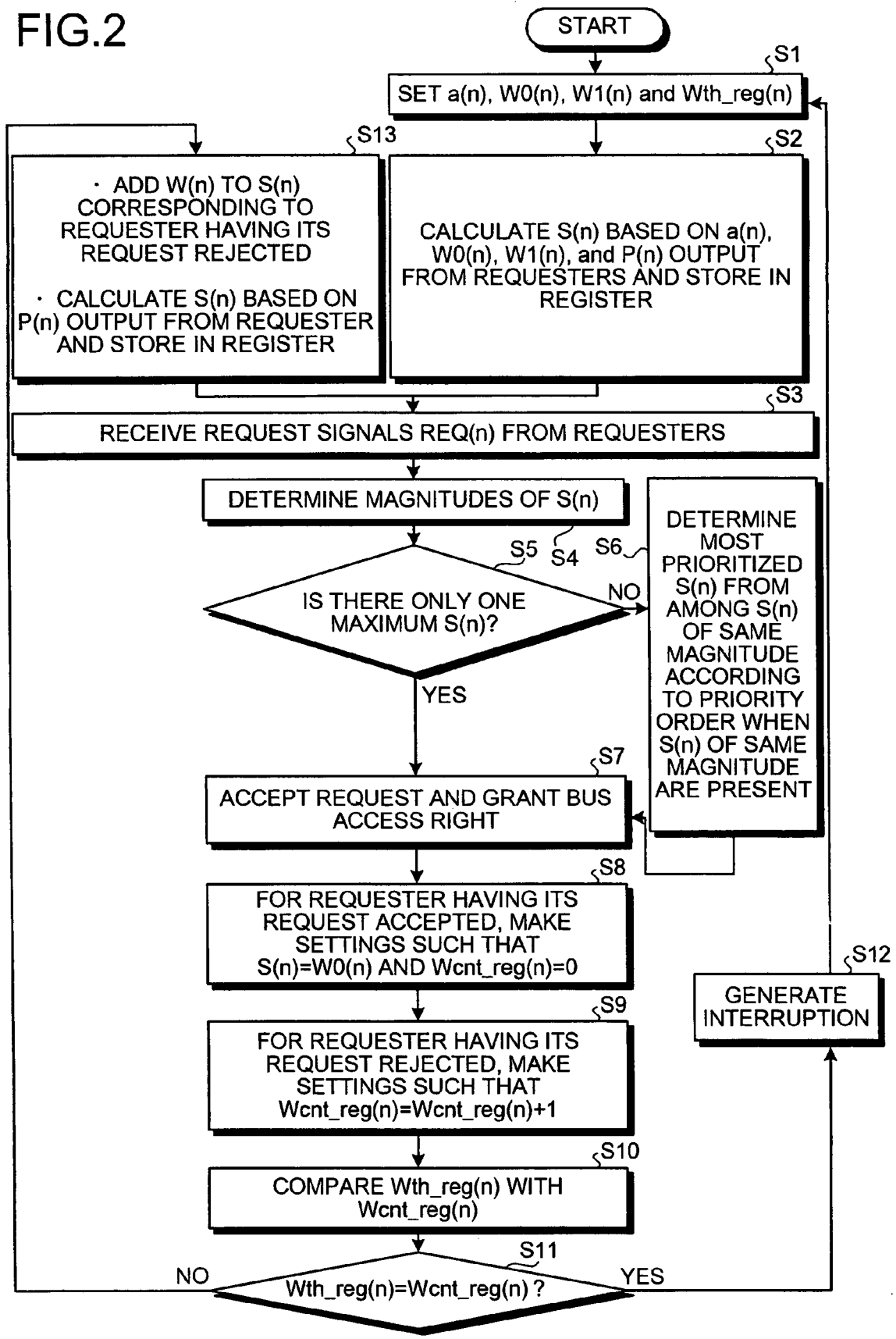
FIG. 2 is a flowchart of a processing by the arbiter circuit.

FIG. 2 is a flowchart of a processing by the arbiter circuit. As shown in FIG. 2, when an arbitration process starts, the CPU 2 first sets multiplier coefficients a(n), score defaults W0(n), increments W1(n), and rejection count thresholds Wth_reg(n) (step S1). The multiplier coefficients a(n), the score defaults W0(n), and the increments W1(n) are stored in the initial setting register 10. The rejection count thresholds Wth_reg(n) are stored in the threshold register 18.

Next, the priority coefficient calculating unit 11 calculates arbitration priority coefficients S(n) based on the multiplier coefficients a(n), the score defaults W0(n), and the increments W1(n), as well as priority levels P(n) output from requesters, and stores them in the priority coefficient register 12 (step S2). Then, the acceptance determining unit 15 receives request signals REQ(n) from the requesters (step S3). Then, the priority coefficient comparator 13 determines magnitudes of the arbitration priority coefficients S(n) stored in the priority coefficient register 12 (step S4).

When it is determined that only one maximum arbitration priority coefficient S(n) is present (step S5: YES), the acceptance determining unit 15 accepts a request from a requester corresponding to the maximum arbitration priority coefficient S(n), and grants a right to use the bus to that requester (step S7). On the other hand, when it is determined that more than one maximum arbitration priority coefficients S(n) is present (step S5: NO), the most prioritized arbitration priority coefficient S(n) is determined from among the arbitration priority coefficients S(n) of the same magnitude according to a preset order of priorities when preset arbitration priority coefficients S(n) of the same magnitude are present (step S6). Then, the acceptance determining unit 15 accepts a request from a requester corresponding to the most prioritized arbitration priority coefficient S(n), and grants a right to use the bus to that requester (step S7).

Next, for the requester having its request accepted, settings are made such that [S(n)=W0(n)] and [Wcnt_reg(n)=0] (step S8). As for any requester having its request rejected, settings are made such that [Wcnt_reg(n)=Wcnt_reg(n)+1] (step S9). That is, 1 is added to the rejection count Wcnt_reg(n).

Next, the rejection count threshold Wth_reg(n) and the rejection count Wcnt_reg(n) are compared with each other (step S10). As a result, if any requester with [Wth_reg(n)=Wcnt_reg(n)] is present (step S11: YES), interruption of the CPU 2 is generated (step S12). For the requester with [Wth_reg(n)=Wcnt_reg(n)] at step S11, the procedure returns to step S1 to change at least one of the multiplier coefficient a(n), the score W(n), the increment W1(n), and the rejection count threshold Wth_reg(n). After the changing, processing at step S2 and subsequent steps is repeated.

As for the requester determined as not having [Wth_reg(n)=Wcnt_reg(n)] at step S11 (step S11: NO), a score W(n) is added to an arbitration priority coefficient S(n) corresponding to a requester having its request rejected. In addition, the arbitration priority coefficient S(n) is calculated based on the priority level P(n) output from the requester, and stored to the priority coefficient register 12 (step S13). Then, the procedure proceeds to step S3, and processing at step S3 and subsequent steps is repeated. Note that for each requester, the procedure branches according to determination at step S11.

Next, a case where four requesters A, B, C, and D are present will be described in conjunction with concrete numerical values. First, after system resetting, the CPU 2 previously sets to the initial setting register 10 multiplier coefficients a(n), score defaults W0(n) and increments W1(n) corresponding to the requesters A4, B5, C6, and D7. As an example, it is assumed here that [a(0)=a(1)=a(2)=a(3)=1], [W0(0)=W0(1)=2], [W0(2)=W0(3)=3], [W1(0)=3], [W1(1)=W1(2)=1], and [W1(3)=2]. Also, the CPU 2 sets rejection count thresholds Wth_reg(n) in the threshold register 18 such that [Wth_reg(0)=Wth_reg(1)=Wth_reg(2)=31], and [Wth_reg(3)=2].

After setting each value, the acceptance determining unit 15 periodically determines whether a request signal REQ(0) from the requester A4, a request signal REQ(1) from the requester B5, a request signal REQ(2) from the requester C6, and a request signal REQ(3) from the requester D7 are at H (high) level, i.e., whether any request is made. Hereinafter, the timing of determining acceptance of requests is referred to as the "request acceptance determining cycle".

Although not limited, it is assumed that there are requests from all the requesters in the first cycle. It is assumed that priority levels P(n) from the requesters at this time are such that [P(0)=P(1)=P(2)=P(3)=0]. In this case, at the first request acceptance determining cycle, no increment W1($n$) is given to the arbitration priority coefficient S(n) for any of the requesters A4, B5, C6, and D7, and therefore calculation by the priority coefficient calculating unit 11 gives [S(0)=S(1)=2] and [S(2)=S(3)=3].

Next, the priority coefficient comparator 13 compares the arbitration priority coefficients S(n). S(2) and S(3) are equal as described above, and therefore, the priority coefficient comparator 13 refers to the priority determining unit 14 to determine which one of S(2) and S(3) is to be accepted. For example, it is assumed that, when the arbitration priority coefficients S(n) are equal, the priority determining unit 14 is preset to accept requests in the order: S(3), S(2), S(1), and S(0). Accordingly, in this example, the acceptance determining unit 15 accepts the request signal REQ(3) corresponding to S(3), and grants a bus access right to the requester D7 from which the request signal REQ(3) is originated.

For the requester D7 having its request accepted, the increment W1(3) is not added to the arbitration priority coefficient S(3), and therefore the arbitration priority coefficient S(3) remains 3. The rejection count Wcnt_reg(3) corresponding to the requester D7 is 0. As for the requesters A4, B5, and C6 having their request rejected, the increments W1(0), W1(1), and W1(2) are added to the arbitration priority coefficients S(0), S(1), and S(2), respectively, so that [S(0)=5], [S(1)=3], and [S(2)=4]. In addition, [Wcnt_reg(0)=Wcnt_reg(1)=Wcnt_reg(2)=1].

It is assumed that in the next request acceptance determining cycle, all the requesters issue requests. In this case, it is assumed that the priority levels P(n) from the requesters are such that [P(0)=P(1)=P(2)=P(3)=0]. In such a case, S(0) is the highest, and therefore, the acceptance determining unit 15 accepts a request signal REQ(0) corresponding to S(0), and grants a bus access right to the requester A4 from which the request signal REQ(0) is originated.

For the requester A4 having its request accepted, an increase of 3 given by the increment W1(0) added to the arbitration priority coefficient S(0) up to this point becomes 0, and therefore the arbitration priority coefficient S(0) becomes 2. In addition, the rejection count Wcnt_reg(0) for the requester A4 becomes 0. As for the requesters B5, C6 and D7 having their requests rejected, the increments W1(1), W1(2), and W1(3) are added to the arbitration priority coefficients S(1), S(2), and S(3), respectively, so that [S(1)=4] and [S(2)=S(3)=5]. In addition, [Wcnt_reg(1)=Wcnt_reg(2)=2] and [Wcnt_reg(3)=1].

As such, comparing with the first request acceptance determining cycle, the priorities for the requesters not having been selected in the first request acceptance determining cycle are increased in the second request acceptance determining cycle. Accordingly, the frequencies of accepting requests are equalized when a confliction occurs between requests from a plurality of requesters.

It is assumed that all the requesters issue requests in the further next request acceptance determining cycle. In this case, it is assumed that the requester C6 issues a high priority request at discretion of the requester, and the priority level P(2) is 10. The priority levels P(n) of the other requesters are such that [P(0)=P(1)=P(3)=0]. In such a case, the arbitration priority coefficients S(n) for the requesters are such that [S(0)=2], [S(1)=4], [S(2)=15], and [S(3)=5]. Accordingly, the acceptance determining unit 15 accepts a request signal REQ(2) corresponding to S(2), and grants a bus access right to the requester C6 from which the request signal REQ(2) is originated.

For the requester C6 having it request accepted, an increase of 2 given by the increment W1(2) added to the arbitration priority coefficient S(2) up to this point becomes 0, and an increase of 10 given by [a(2)×P(2)] becomes 0. Therefore the arbitration priority coefficient S(2) becomes 3. In addition, the rejection count Wcnt_reg(2) for the requester C6 becomes 0. As for the requesters A4, B5, and D7 having their request rejected, the increments W1(0), W1(1), and W1(3) are added to the arbitration priority coefficients S(0), S(1), and S(3), respectively, so that [S(0)=S(1)=5], and [S(3)=7]. In addition, [Wcnt_reg(0)=1], [Wcnt_reg(1)=3], and [Wcnt_reg(3)=2].

As such, the arbitration priority coefficients S(n) are obtained with consideration of the priority levels P(n) notified from the requesters, and whether to accept requests are determined by comparing their magnitudes. Therefore, it is possible not only to equalize the frequencies of accepting the requests, but also to perform arbitration with consideration of the weight and urgency of the requests. Specifically, it is possible for the requesters themselves to arbitrarily change their own arbitration priority levels.

In the foregoing example, the rejection count Wcnt_reg(n) is not equal to the rejection count threshold Wth_reg(n), but it is conceivable that, for example, [Wcnt_reg(3)=Wth_reg(3)] in a request acceptance determining cycle. In such a case, the rejection count comparator 19 notifies the CPU 2 of interruption. When notified of the interruption, the CPU 2 determines that the requester D7 has an unexpectedly high wait count. Then, the CPU 2 can change the score default W0(3) or the increment W1(3) for the requester D7 to a higher value as necessary.

As such, because the arbiter circuit 1 has a function of notifying the CPU 2 of interruption, and the CPU 2 has a function of changing set points for an arbitrary requester, it is possible to decrease the number of rejections on requests from a specific requester to an expected level or lower. That is, it is possible that requests from all requesters are accepted with wait counts kept at an expected level or lower. Thus, it is possible to realize flexible arbitration according to various situations.

According to the embodiments described above, it is possible to externally change arbitration priority levels for a plurality of requests, thereby enabling flexible arbitration and enhancing overall system processing efficiency.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An arbiter circuit comprising:
    a calculating unit that calculates an arbitration priority coefficient of each of requests made by requesters, based on a priority level externally set for each request;
    a comparing unit that compares the arbitration priority coefficients calculated by the calculating unit;
    an acceptance determining unit that determines whether to accept the requests based on a result of comparison by the comparing unit;
    a rejection counter that counts a value indicative of number of rejection of the requests for each of the requesters; and
    a rejection-count comparator that compares the value with a threshold,
    wherein the threshold value is chancied when the value reaches the threshold.

2. The arbiter circuit according to claim 1, further comprising a priority determining unit that, when the arbitration priority coefficients are equal between two or more requests among the requests, determines a order of priority for accepting the two or more requests.

3. The arbiter circuit according to claim 1, wherein when the value reaches the threshold, the rejection-count comparator causes interruption, and notifies the interruption to outside.

4. The arbiter circuit according to claim 1, wherein the rejection counter resets a value corresponding to a requester of which request has been determined to be accepted at a previous round.

5. The arbiter circuit according to claim 1, wherein the calculating unit calculates the arbitration priority coefficient further based on number of rejection made to the requests for each of the requesters.

6. The arbiter circuit according to claim 1, wherein the calculating unit calculates the arbitration priority coefficient corresponding to an accepted requester of which a request has been determined to be accepted at a previous round, while cancelling a value given in consideration of number of rejection made to a request from the accepted requester, the number counted up until the request is determined to be accepted.

7. The arbiter circuit according to claim 1, wherein the calculating unit weights the arbitration priority coefficient for each of the requesters based on a coefficient externally set for each of the requesters.

8. An arbitrating method comprising:
    calculating an arbitration priority coefficient of each of requests made by requesters, based on a priority level externally set for each request;
    comparing the calculated arbitration priority coefficients
    determining whether to accept the requests based on a result of comparison;
    counting a value indicative of number of rejection of the requests for each of the requesters;
    comparing the value with a threshold; and
    changing the threshold value when the value reaches the threshold.

9. The arbiter circuit according to claim 1, wherein the threshold value is decreased when the value reaches the threshold.

10. The arbitrating method according to claim 8, wherein the threshold value is decreased when the value reaches the threshold.

11. An arbitrating system comprising:
    a CPU; and
    an arbiter,
    wherein the arbiter includes:
        a calculating unit that calculates an arbitration priority coefficient of each of requests made by requesters, based on a priority level externally set for each request;
        a comparing unit that compares the arbitration priority coefficients calculated by the calculating unit;
        an acceptance determining unit that determines whether to accept the requests based on a result of comparison by the comparing unit;
        a rejection counter that counts a value indicative of number of rejection of the requests for each of the requesters; and
        a rejection-count comparator that compares the value with a threshold,
    wherein, when the value reaches the threshold, the rejection-count comparator notifies an interruption to the CPU, and
    wherein the CPU changes the threshold.

12. The arbitrating system according to claim 11, wherein the threshold value is decreased when the value reaches the threshold.

* * * * *